United States Patent
Meng et al.

(10) Patent No.: US 11,783,168 B2
(45) Date of Patent: Oct. 10, 2023

(54) NETWORK ACCURACY QUANTIFICATION METHOD AND SYSTEM, DEVICE, ELECTRONIC DEVICE AND READABLE MEDIUM

(71) Applicant: LYNXI TECHNOLOGIES CO., LTD., Beijing (CN)

(72) Inventors: Fanhui Meng, Beijing (CN); Chuan Hu, Beijing (CN); Han Li, Beijing (CN); Xinyang Wu, Beijing (CN); Yaolong Zhu, Beijing (CN)

(73) Assignee: LYNXI TECHNOLOGIES CO., LTD., Beijing (CN)

( * ) Notice: Subject to any disclaimer, the term of this patent is extended or adjusted under 35 U.S.C. 154(b) by 0 days.

(21) Appl. No.: 17/760,023

(22) PCT Filed: Jun. 9, 2021

(86) PCT No.: PCT/CN2021/099198
§ 371 (c)(1),
(2) Date: Aug. 3, 2022

(87) PCT Pub. No.: WO2021/249440
PCT Pub. Date: Dec. 16, 2021

(65) Prior Publication Data
US 2023/0040375 A1    Feb. 9, 2023

(30) Foreign Application Priority Data

Jun. 9, 2020 (CN) .......................... 202010519846.1

(51) Int. Cl.
*G06N 3/063* (2023.01)
*G06F 9/50* (2006.01)

(52) U.S. Cl.
CPC ........... *G06N 3/063* (2013.01); *G06F 9/5027* (2013.01)

(58) Field of Classification Search
CPC .............................. G06F 9/5027; G06N 3/063
See application file for complete search history.

(56) References Cited

U.S. PATENT DOCUMENTS 11,551,054 B2 *   1/2023   Choi ...................... G06N 3/045
2017/0329642 A1   11/2017  Kim et al.

FOREIGN PATENT DOCUMENTS

| CN | 105843679 A | 8/2016 |
| CN | 108564168 A | 9/2018 |
| CN | 110348562 A | 10/2019 |

OTHER PUBLICATIONS

Baek, Eunjin, Dongup Kwon, and Jangwoo Kim. "A multi-neural network acceleration architecture." 2020 ACM/IEEE 47th Annual International Symposium on Computer Architecture (ISCA). IEEE, 2020. (Year: 2020).*

(Continued)

*Primary Examiner* — Benjamin P Geib
(74) *Attorney, Agent, or Firm* — Li & Cai Intellectual Property (USA) Office

(57) ABSTRACT

Disclosed are a network accuracy quantification method, system, and device, an electronic device and a readable medium, which are applicable to a many-core chip. The method includes: determining a reference accuracy according to a total core resource number of the many-core chip and the number of core resources required by each network to be quantified, with the number of the core resources required by each network to be quantified being the number of the core resources which is determined after each network to be quantified is quantified; and determining a target accuracy corresponding to each network to be quantified according to the reference accuracy and the total core resource number of the many-core chip.

13 Claims, 9 Drawing Sheets

(56) References Cited

OTHER PUBLICATIONS

Xu, Zirui, et al. "Reform: Static and dynamic resource-aware dnn reconfiguration framework for mobile device." Proceedings of the 56th Annual Design Automation Conference 2019. 2019. (Year: 2019).*
Fang, Biyi, Xiao Zeng, and Mi Zhang. "Nestdnn: Resource-aware multi-tenant on-device deep learning for continuous mobile vision." Proceedings of the 24th Annual International Conference on Mobile Computing and Networking. 2018. (Year: 2018).*
Yang, Tien-Ju, et al. "Netadapt: Platform-aware neural network adaptation for mobile applications." Proceedings of the European Conference on Computer Vision (ECCV). 2018. (Year: 2018).*
Wang, Kuan, et al. "HAQ: Hardware-Aware Automated Quantization with Mixed Precision." arXiv:1811.08886v3 (2018). (Year: 2018).*
WIPO, International Search Report dated Aug. 27, 2021.

* cited by examiner

NETWORK ACCURACY QUANTIFICATION METHOD AND SYSTEM, DEVICE, ELECTRONIC DEVICE AND READABLE MEDIUM

CROSS-REFERENCE TO RELATED APPLICATIONS

The present application is a National Phase Application filed under 35 U.S.C. 371 as a national stage of PCT/CN2021/099198, filed on Jun. 9, 2021, an application claiming priority from Chinese Patent Application No. 202010519846.1, filed on Jun. 9, 2020 in the Chinese Intellectual Property Office, contents of which are hereby incorporated herein by reference in their entirety.

TECHNICAL FIELD

The present disclosure relates to the field of neural network technologies, and in particular, to a network accuracy quantification method, a network accuracy quantification system, a device, an electronic device, and a readable medium.

BACKGROUND

A many-core chip has certain advantages when being applied to a neural network, for example, the many-core chip can support coexistence of a plurality of neural networks. When resources in the chip are allocated to the neural networks, accuracy quantification can be performed on the neural networks. However, there are problems in the related art that the resources in the chip are not fully used or a large accuracy loss is caused due to excessive quantification.

SUMMARY

The present disclosure provides a network accuracy quantification method, a network accuracy quantification system, a device, an electronic device and a readable medium.

In a first aspect, the present disclosure provides a network accuracy quantification method applicable to a many-core chip, including: determining a reference accuracy according to a total core resource number of the many-core chip and the number of core resources required by each network to be quantified, with the number of the core resources required by each network to be quantified being the number of the core resources which is determined after each network to be quantified is quantified; and determining a target accuracy corresponding to each network to be quantified according to the reference accuracy and the total core resource number of the many-core chip.

In a second aspect, the present disclosure provides a method for allocating resources in a chip, including: allocating core resources in a many-core chip to a neural network according to a target accuracy corresponding to the neural network, where the target accuracy is determined with the network accuracy quantification method provided herein.

In a third aspect, the present disclosure provides a network accuracy quantification system applicable to a many-core chip, including: a reference accuracy determination module configured to determine a reference accuracy according to a total core resource number of the many-core chip and the number of core resources required by each network to be quantified, with the number of the core resources required by each network to be quantified being the number of the core resources which is determined after each network to be quantified is quantified; and a target accuracy determination module configured to determine a target accuracy corresponding to each network to be quantified according to the reference accuracy and the total core resource number of the many-core chip.

In a fourth aspect, the present disclosure provides a device for allocating resources in a chip, including: a target accuracy determination module configured to determine a target accuracy with the network accuracy quantification method provided herein; and a resource allocation module configured to allocate core resources in a many-core chip to a neural network according to the target accuracy corresponding to the neural network.

In a fifth aspect, the present disclosure provides an electronic device, which includes: a plurality of processing cores; and a network on chip configured for interchange of data among the plurality of processing cores and interchange with external data; where one or more processing cores have stored therein one or more instructions which, when executed by the one or more processing cores, cause the one or more processing cores to perform the above network accuracy quantification method and the above method for allocating resources in a chip.

In a sixth aspect, the present disclosure provides a computer-readable storage medium having stored thereon a computer program which implements, when executed by a processor, the above network accuracy quantification method and the above method for allocating resources in a chip.

With the network accuracy quantification method and system, the device, the electronic device and the readable medium provided herein, the reference accuracy is determined according to the total core resource number of the many-core chip and the number of the core resources required by each network to be quantified, and the target accuracy corresponding to each network to be quantified is then determined according to the reference accuracy and the total core resource number of the many-core chip, so that the quantification accuracy of the network to be quantified can be improved, and allocation and unitization of a memory in a chip can be facilitated. Moreover, even in a process of allocating a memory to a plurality of network modules in a chip, limited memory resources in the chip can be fully used, and meanwhile accuracy loss caused by excessive quantification of a neural network can be reduced.

It should be understood that what is described herein is not intended to indicate key features or critical features of embodiments of the present disclosure, and is not used to limit the scope of the present disclosure. Other features of the present disclosure will become apparent from the following description.

BRIEF DESCRIPTION OF DRAWINGS

The accompany drawings are intended to provide a further understanding of the present disclosure and constitute a part of the specification. Together with the embodiments of the present disclosure, the drawings are used to explain the present disclosure, but do not constitute any limitation to the present disclosure. The above and other features and advantages will become more apparent to those skilled in the art through the description of specific exemplary embodiments with reference to the drawings.

In the drawings.

Figure 1:
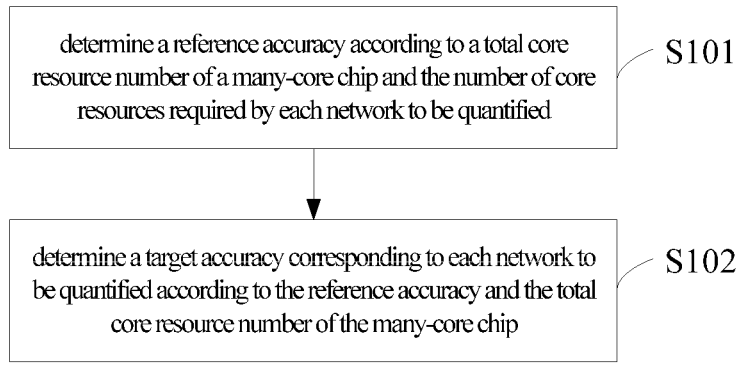
FIG. 1 is a flowchart illustrating a network accuracy quantification method according to the present disclosure.

1—first network; 2—second network; 3—third network; 4—fourth network; 5—fifth network; 6—sixth network; 7—seventh network.

DETAIL DESCRIPTION OF EMBODIMENTS

In order to enable those skilled in the art to better understand the technical solutions of the present disclosure, exemplary embodiments of the present disclosure are described below with reference to the drawings. For facilitating the understanding, various details of the embodiments of the present disclosure are described when describing the exemplary embodiments and should be regarded as being merely exemplary. Accordingly, those skilled in the art should be aware that various changes and modifications to the embodiments described herein may be made without departing from the scope and spirit of the present disclosure. Moreover, descriptions of well-known functions and structures are omitted from the following description for clarity and conciseness.

All the embodiments of the present disclosure and features therein can be combined with each other if no conflict is incurred.

As used herein, the term "and/or" includes any one or all combinations of one or more associated listed items.

The terms used herein are only used to describe particular embodiments, and are not intended to limit the present disclosure. As used herein, "a" and "the" indicating a singular form is also intended to indicate a plural form. Unless expressly stated otherwise, it should be further understood that the term "comprise" and/or "made of . . . " used herein indicates the presence of the described features, integers, steps, operations, elements and/or components, but does not exclude the presence or addition of one or more other features, integers, steps, operations, elements, components and/or combinations thereof. The terms "connect", "couple" and the like are not restricted to physical or mechanical connection, but may also indicate electrical connection, whether direct or indirect.

Unless otherwise defined, all terms (including technical and scientific terms) used herein have the same meaning as commonly understood by those of ordinary skill in the art. It should be further understood that terms, such as those defined in commonly used dictionaries, should be interpreted as having a meaning that is consistent with a meaning in the context of the related art and the present disclosure, and should not be interpreted in an idealized or overly formal sense unless expressly so defined herein.

Since chip storage resources in an artificial intelligence chip are limited, it becomes very important to perform accuracy quantification on a neural network model as the consumption of the chip storage resources by a neural network increases. A many-core chip includes a plurality of cores, and has great advantages when being applied to the neural network. Since the many-core chip has the plurality of cores, accuracy quantification is not simple accuracy selection. When a plurality of neural networks coexist, resources need to be reasonably allocated to the plurality of networks, so as to improve utilization of the core resources and reduce accuracy loss caused by excessive quantification. A method provided by the present disclosure is directed to a condition where a many-core chip supports coexistence of a plurality of networks. With the method, based on the number of the networks and awareness of the core resources, multi-grade quantification of multiple network accuracy is carried out by means of multi-grade dynamic programming according to resources in the many-core chip and specific resource requirements of the plurality of networks, and resources for each network are dynamically programmed and allocated, thereby achieving reasonable resource allocation and full utilization of the resources in the chip, and reducing the accuracy loss caused by excessive quantification.

In a first aspect, the present disclosure provides a network accuracy quantification method applicable to a many-core chip.

FIG. 1 is a flowchart illustrating a network accuracy quantification method according to the present disclosure. With reference to FIG. 1, the network accuracy quantification method includes steps S101 and S102.

In step S101, a reference accuracy is determined according to a total core resource number of a many-core chip and the number of core resources required by each network to be quantified.

The number of the core resources required by each network to be quantified is the number of the core resources which is determined after each network to be quantified is quantified. In general, only when a total number of the core resources required for quantifying all networks to be quantified according to the reference accuracy is less than or equal to the total core resource number of the many-core chip, the many-core chip may meet a requirement of the core resources of each network to be quantified.

The number of the core resources required by the network to be quantified refers to the number of the core resources required for quantifying the network to be quantified to determine the network to be quantified. When each network to be quantified is quantified, the quantification may be performed according to a certain accuracy. The higher the accuracy is, the greater the number of the core resources required by the network to be quantified is; and the lower the accuracy is, the smaller the number of the core resources required by the network to be quantified is. The quantification accuracy may be set in advance, for example, sorting is carried out according to grades of quantification accuracy, and when the quantification accuracy is set, the quantification accuracy may be set in an order from a high-grade quantification accuracy to a low-grade quantification accuracy.

In step S102, a target accuracy corresponding to each network to be quantified is determined according to the reference accuracy and the total core resource number of the many-core chip.

The networks to be quantified may be various neural network models which need to be quantified. The total core resource number of the many-core chip may refer to the number of cores of the many-core chip or core storage resources of the many-core chip.

In addition, the reference accuracy and the target accuracy may be determined from various kinds of quantification accuracy. For example, the quantification accuracy may include one or more of fp32 (a 32-bit data type), fp16 (a 16-bit data type), int8 (an 8-bit data type), and int4 (a 4-bit data type).

For example, the reference accuracy and the target accuracy may be selected from fp32, fp16, int8, and int4. The target accuracy corresponding to each network to be quantified may be the same, or the networks to be quantified may correspond to different target accuracies. For example, the target accuracy corresponding to each network to be quantified is fp32; or the target accuracy corresponding to each network to be quantified is int8.

In some embodiments, the reference accuracy is determined through at least one computation cycle according to the total core resource number of the many-core chip and the number of the core resources required by each network to be quantified, different computation cycles adopt different quantification accuracies, and calculation is ended when a preset cut-off condition is met.

Figure 2:
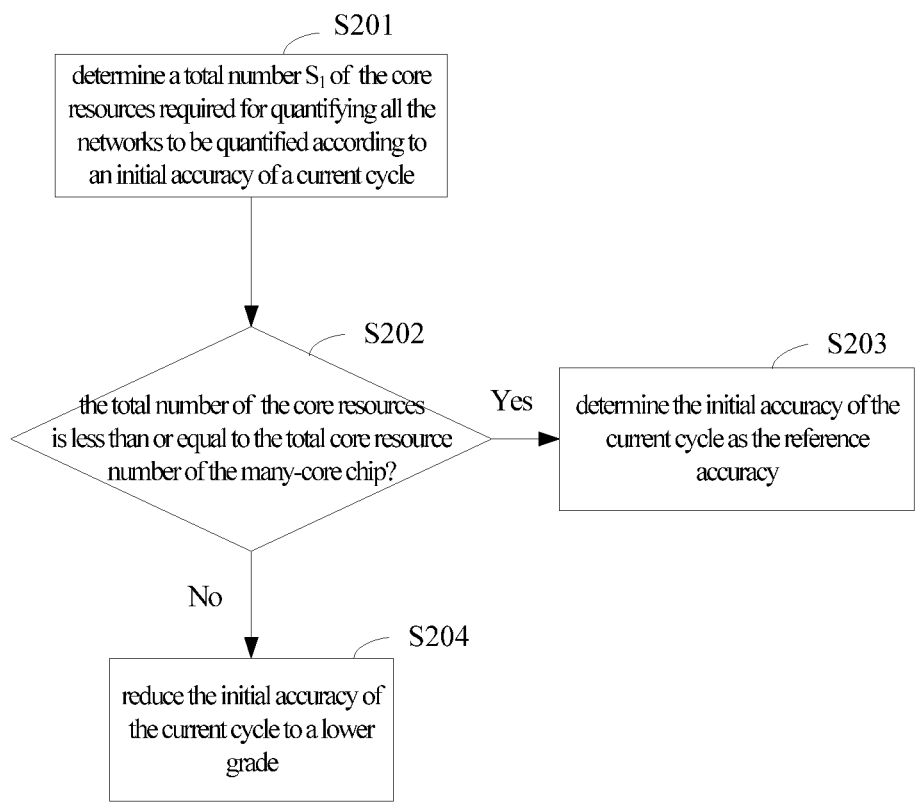
FIG. 2 is a flowchart of determining a reference accuracy according to the present disclosure.

As shown in FIG. 2, in some embodiments, determining the reference accuracy according to the total core resource number of the many-core chip and the number of the core resources required by each network to be quantified includes steps S201 to S204.

In step S201, a total number of the core resources required for quantifying all the networks to be quantified according to an initial accuracy of a current cycle is determined.

The current cycle refers to a computation cycle. If the number of the core resources required by the networks to be quantified is calculated in the first computation cycle, the current cycle is the first computation cycle. If the number of the core resources required by the networks to be quantified is calculated in the second computation cycle, the current cycle is the second computation cycle, and so on.

In step S202, whether the total number of the core resources is less than or equal to the total core resource number of the many-core chip is determined to obtain a determination result.

In some embodiments, the total number of the core resources required for quantifying all the networks to be quantified according to the initial accuracy of the current cycle is compared with the total core resource number of the many-core chip, that is, the total number of the core resources and the total core resource number are compared in terms of magnitude, thus obtaining the determination result.

In step S203, in a case where the determination result is yes, the initial accuracy of the current cycle is determined as the reference accuracy.

When the determination result is yes, that is, when the total number of the core resources is less than or equal to the total core resource number of the many-core chip, it is indicated that the many-core chip may meet a requirement of the total number of the core resources required for quantifying neural networks according to the initial accuracy of the current cycle, so that the initial accuracy of the current cycle is determined as the reference accuracy. When the total number of the core resources is greater than the total core resource number of the many-core chip, it is indicated that the many-core chip may not meet the requirement of the total number of the core resources required for quantifying the neural networks according to the initial accuracy of the current cycle.

In step S204, in a case where the determination result is no, the initial accuracy of the current cycle is reduced to a lower grade to determine an initial accuracy of a next computation cycle.

When the determination result is no, that is, when the total number of the core resources required for quantifying all the networks to be quantified according to the initial accuracy of the current cycle is greater than the total core resource number of the many-core chip, it is indicated that the total core resource number of the many-core chip may not meet the requirement of the total number of the core resources required for quantifying all the networks to be quantified according to the initial accuracy of the current cycle. Therefore, the initial accuracy of the current cycle is reduced to a lower grade, and a quantification accuracy such obtained is determined as the initial accuracy of the next computation cycle.

It should be noted that the preset cut-off condition in the embodiments may be set by a user. For example, the preset cut-off condition is that the total number of the core resources required for quantifying all the networks to be quantified according to the initial accuracy of the current cycle is less than or equal to the total core resource number of the many-core chip.

Figure 3:
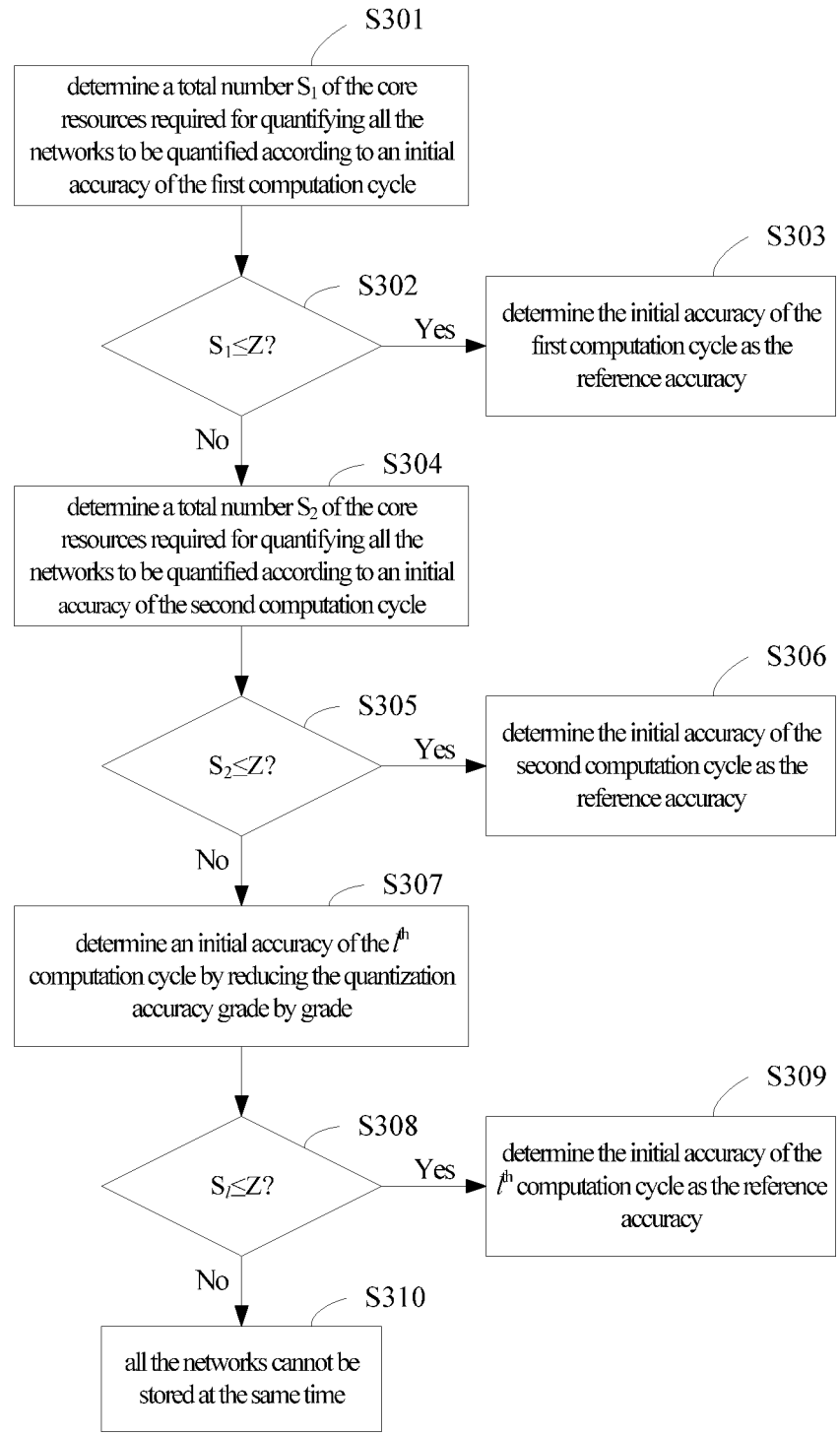
FIG. 3 is another flowchart of determining a reference accuracy according to the present disclosure.

FIG. 3 is a flowchart of determining the reference accuracy according to the total core resource number of the many-core chip and the number of the core resources required by each network to be quantified according to the present disclosure. In the embodiments, the reference accuracy is determined through/computation cycles. As shown in FIG. 3, determining the reference accuracy according to the total core resource number of the many-core chip and the number of the core resources required by each network to be quantified includes steps S301 to S310.

In step S301, a total number $S_1$ of core resources required for quantifying all the networks to be quantified according to an initial accuracy of the first computation cycle is determined.

Assuming that the initial accuracy of the first computation cycle is a first-grade accuracy, in step S301, the total number $S_1$ of the core resources required for quantifying all the networks to be quantified according to the first-grade accuracy is determined.

In step S302, whether the total number $S_1$ of the core resources is less than or equal to the total core resource number Z of the many-core chip is determined.

In some embodiments, the total number $S_1$ of the core resources required for quantifying all the networks to be quantified according to the first-grade accuracy is compared with the total core resource number Z of the many-core chip.

In step S303, when the total number $S_1$ of the core resources is less than or equal to the total core resource number Z of the many-core chip, which indicates that the many-core chip may meet a requirement of a total number of the core resources required for quantifying neural networks according to the initial accuracy quantification of the first computation cycle, the initial accuracy corresponding to the first computation cycle is determined as the reference accuracy.

In step S303, when the total number $S_1$ of the core resource is less than or equal to the total core resource number Z of the many-core chip, which indicates that the many-core chip may meet a requirement of a total number of the core resources required for quantifying neural networks according to the first-grade accuracy, the first-grade accuracy is determined as the reference accuracy.

In step S304, in a case where the total number $S_1$ of the core resources is greater than the total core resource number Z of the many-core chip, the first-grade accuracy is reduced to a lower grade to determine an initial accuracy of the second computation cycle, and a total number $S_2$ of the core resources required for quantifying all the networks to be quantified according to the initial accuracy of the second computation cycle is determined.

When the total number $S_1$ of the core resources is greater than the total core resource number Z of the many-core chip, which indicates that the many-core chip may not meet the requirement of the total number of the core resources required for quantifying neural networks according to the first-grade accuracy, the quantification accuracy needs to be reduced to a lower grade to determine the initial accuracy of the second computation cycle. If the initial accuracy of the second computation cycle is a second-grade accuracy, in step S304, the total number $S_2$ of the core resources required for quantifying all the networks to be quantified according to the second-grade accuracy is determined.

In step S305, whether the total number $S_2$ of the core resources is less than or equal to the total core resource number Z of the many-core chip is determined.

In step S305, the total number $S_2$ of the core resources required for quantifying all the networks to be quantified according to the second-grade accuracy is compared with the total core resource number Z of the many-core chip.

In step S306, when the total number $S_2$ of the core resources is less than or equal to the total core resource number Z of the many-core chip, which indicates the many-core chip may meet the requirement of the total number of the core resources required for quantifying neural networks according to the second-grade accuracy, the initial accuracy of the second computation cycle is determined as the reference accuracy, that is, the second-grade accuracy is determined as the reference accuracy.

When the total number $S_2$ of the core resources is greater than the total core resource number Z of the many-core chip, it is indicated that the many-core chip may not meet the requirement of a total number of the core resources required for quantifying neural networks according to the second-grade accuracy.

In step S307, in a case where the total number $S_2$ of the core resources is greater than the total core resource number Z of the many-core chip, the quantification accuracy is reduced again in a manner that the quantification accuracy is reduced grade by grade, and so on, until an initial accuracy of the $l^{th}$ computation cycle is determined, and the $l^{th}$ computation cycle is started, where l denotes a number of the computation cycle, and l is an integer greater than or equal to 1.

In step S308, whether a total number $S_l$ of the core resource required for quantifying all the networks to be quantified according to an $l^{th}$-grade accuracy is less than or equal to the total core resource number Z of the many-core chip is determined.

In step S309, when the total number $S_l$ of the core resources is less than or equal to the total core resource number Z of the many-core chip, the initial accuracy of the $l^{th}$ computation cycle, i.e., the $l^{th}$-grade accuracy, is determined as the reference accuracy.

In other words, in a case where the total number of the core resources is greater than the total core resource number Z of the many-core chip, the quantification accuracy is reduced, the total number of the core resources required for quantifying all the networks to be quantified according to the reduced accuracy is then compared with the total core resource number Z of the many-core chip, and so on, until the total number of the core resources required for quantifying all the networks to be quantified according to the latest accuracy is less than or equal to the total core resource number Z of the many-core chip, and the latest quantification accuracy is determined as the reference accuracy.

In step S310, when the total number $S_l$ of the core resources is greater than the total core resource number Z of the many-core chip, it is determined that all the networks cannot be stored at the same time.

It should be noted that the quantification accuracy includes one or more of the first-grade accuracy, the second-grade accuracy, a third-grade accuracy, and a fourth-grade accuracy, with the first-grade accuracy being fp32, the second-grade accuracy being fp16, the third-grade accuracy being int8, and the fourth-grade accuracy being int4.

In the first computation cycle, the initial accuracy may be set to be the first-grade accuracy. In practical applications, the initial accuracy of the $l^{th}$ computation cycle may be set to an accuracy in another grade as required or according to quantification information that is known in advance.

In some embodiments, the first-grade accuracy is determined as the target accuracy corresponding to each network to be quantified.

Illustratively, the first-grade accuracy is the highest accuracy, and each network to be quantified is quantified according to the first-grade accuracy. When the total number of the core resources required for quantifying all the networks to be quantified according to the first-grade accuracy is less than or equal to the total core resource number of the many-core chip, the core resources of the many-core chip are directly allocated to each network to be quantified according to the highest quantification accuracy, so as to make full use of the core resources of the many-core chip, and ensure that each network to be quantified has a high accuracy.

Taking the $L^{th}$ computation cycle as an example, the total number of the core resources required for quantifying all the networks to be quantified according to an initial accuracy of the $L^{th}$ computation cycle is described below.

In some embodiments, the total number of the core resources required for quantifying all the networks to be quantified according to the initial accuracy of the $L^{th}$ computation cycle is determined by the following steps: calculating the number M[i][L] of the core resources required for quantifying each network to be quantified according to the initial accuracy of the $L^{th}$ computation cycle, where i denotes a number of a network to be quantified, and L denotes a number of the computation cycle; and i is a natural number taken from 1 to N, and N is the number of all the networks to be quantified; and determining the total number $S_L$ of the core resources required for quantifying all the networks to be quantified according to the initial accuracy of the $L^{th}$ computation cycle.

$$S_L = \sum_{i=1}^{N} M[i][L],$$

where i denotes the number of the network to be quantified, and L denotes the number of the computation cycle; and i is a natural number taken from 1 to N, and N is the number of all the networks to be quantified.

In some embodiments, the quantification accuracy includes one or more of fp32, fp16, int8, and int4. The quantification accuracy is sorted in order of grade, and the larger the number, the higher the quantification accuracy. For example, the first-grade accuracy is fp32, the second-grade accuracy is fp16, the third-grade accuracy is int8, and the fourth-grade accuracy is int4.

When a total number $S_1$ of the core resources required for quantifying all the networks to be quantified according to fp32 is greater than the total core resource number Z of the many-core chip, the quantification accuracy is reduced grade by grade. For example, a total number $S_2$ of the core resources required for quantifying all the networks to be quantified according to fp16 is determined. If the total number $S_2$ of the core resources required for quantifying all the networks to be quantified according to fp16 is less than or equal to the total core resource number Z of the many-core chip, fp16 is determined as the reference accuracy.

When the total number $S_2$ of the core resources required for quantifying all the networks to be quantified according to fp16 is greater than the total core resource number Z of the many-core chip, the quantification accuracy is continuously reduced grade by grade, a total number $S_3$ of the core resources required for quantifying all the networks to be quantified according to int8 is determined, and int8 is determined as the reference accuracy if the total number $S_3$ of the core resources is less than or equal to the total core resource number Z of the many-core chip. If the total number $S_3$ of the core resources is greater than the total core resource number Z of the many-core chip, the quantification accuracy is reduced grade by grade, and so on. For example, when it is determined that a total number $S_4$ of the core resources required for quantifying all the networks to be quantified according to int4 is less than or equal to the total core resource number Z of the many-core chip, int4 is determined as the reference accuracy.

It should be understood that the reference accuracy may be determined in other ways, as long as the total number of the core resources required for quantifying all the networks to be quantified according to the reference accuracy is less than or equal to the total core resource number of the many-core chip.

Figure 4:
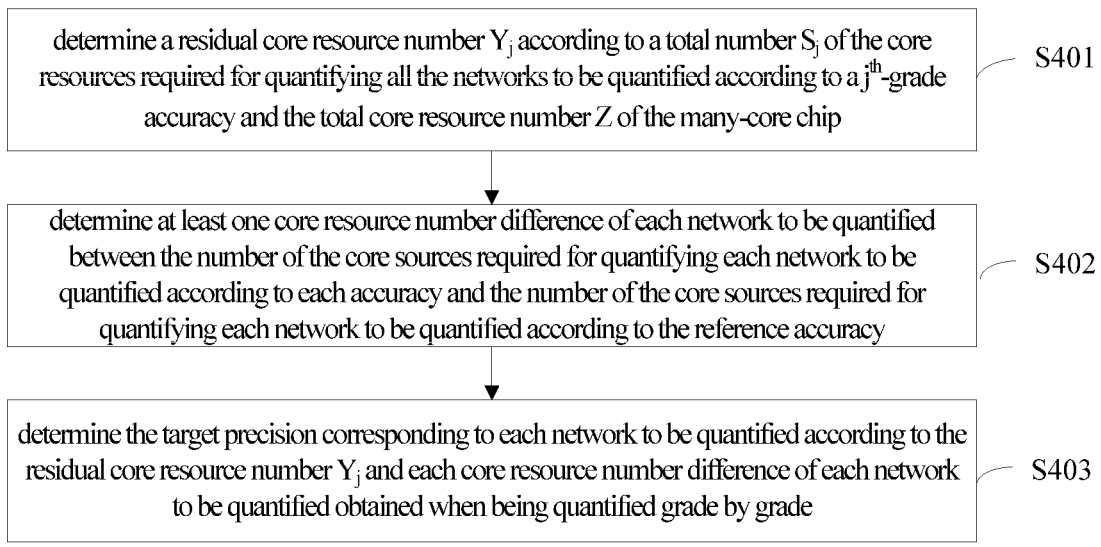
FIG. 4 is a flowchart of determining a target accuracy according to the present disclosure.

FIG. 4 is a flowchart of determining a target accuracy corresponding to each network to be quantified according to a reference accuracy and a total core resource number of a many-core chip according to the present disclosure. For convenience of illustration, the reference accuracy in the embodiments is a $j^{th}$-grade accuracy determined for the $j^{th}$ computation cycle, with j being an integer greater than 1.

As shown in FIG. 4, determining the target accuracy corresponding to each network to be quantified according to the reference accuracy and the total core resource number of the many-core chip includes steps S401 to S403.

In step S401, a residual core resource number $Y_j$ is determined according to a total number $S_j$ of the core resources required for quantifying all the networks to be quantified according to the reference accuracy and the total core resource number Z of the many-core chip.

In some embodiments, the residual core resource number $Y_j$ is a difference obtained by subtracting the total number $S_j$ of the core resources required for quantifying all the networks to be quantified according to the reference accuracy from the total core resource number Z of the many-core chip, that is, the residual core resource number $Y_j=Z-S_j$.

In step S402, at least one core resource number difference W[i]={M[i][1]−M[i][j], M[i][2]−M[i][j] . . . } of each network to be quantified is determined, with the at least one core resource number difference being a difference between the number of the core sources required for quantifying each network to be quantified according to each accuracy and the number of the core sources required for quantifying each network to be quantified according to the reference accuracy.

Where W[i] is a core resource number difference, i is used to denote a number of the network to be quantified and is an integer greater than or equal to 1; and j denotes a grade of quantification accuracy and may be an integer greater than or equal to 1.

In step S403, the target accuracy corresponding to each network to be quantified is determined according to the residual core resource number $Y_j$ and each core resource number difference of each network to be quantified obtained when being quantified grade by grade.

In some embodiments, determining the target accuracy corresponding to each network to be quantified according to the residual core resource number $Y_j$ and each core resource number difference of each network to be quantified obtained when being quantified grade by grade includes: determining, for each network to be quantified, one core resource number difference among the at least one core resource number difference W[i] to allow a sum of all core resource number differences of all the networks to be quantified, when being less than or equal to the residual core resource number $Y_j$, to be the largest; and determining the target accuracy corresponding to each network to be quantified under a condition that the sum of all the core resource number differences of all the networks to be quantified is the largest.

Figure 5:
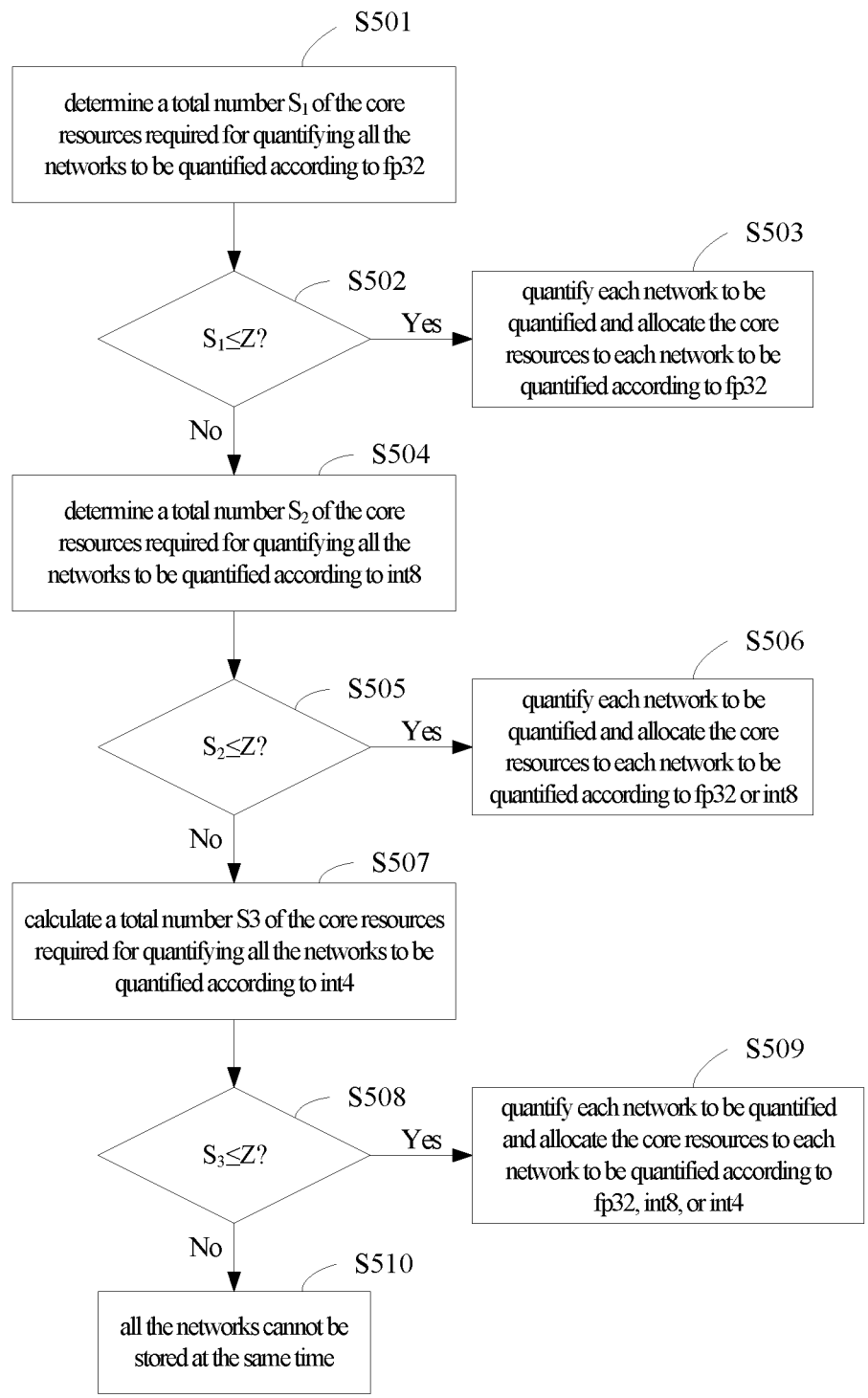
FIG. 5 is a schematic diagram of a process of quantifying a plurality of networks grade by grade according to the present disclosure.

Illustratively, as shown in FIG. 5, a plurality of neural networks are quantified grade by grade according to quantification accuracies of fp32, int8 and int4, that is, the first-grade accuracy is fp32, the second-grade accuracy is int8, and the third-grade accuracy is int4.

In step S501, a total number $S_1$ of the core resources required for quantifying all the networks to be quantified according to fp32 is determined.

In step S502, whether the total number $S_1$ of the core resources is less than or equal to the total core resource number Z of the many-core chip is determined.

In step S503, in a case where the total number $S_1$ of the core resources is less than or equal to the total core resource number Z of the many-core chip, fp32 is determined as the target accuracy of each network to be quantified, and each network to be quantified is quantified and allocated the core resources according to fp32.

In step S504, in a case where the total number $S_1$ of the core resources is greater than the total core resource number Z of the many-core chip, fp32 is reduced to a lower grade, and a total number $S_2$ of the core resources required for quantifying all the networks to be quantified according to int8 is determined.

In step S505, whether the total number $S_2$ of the core resources is less than or equal to the total core resource number Z of the many-core chip is determined.

In step S506, in a case where the total number $S_2$ of the core resources is less than or equal to the total core resource number Z of the many-core chip, int8 is determined as the reference accuracy.

In some embodiments, the target accuracy corresponding to each network to be quantified is determined according to the reference accuracy, and the accuracy of each network to be quantified may be selected from fp32 or int8, as long as it is ensured that total number of the core resources required for quantifying all the networks to be quantified according to their respective target accuracy is less than or equal to the total core resource number Z of the many-core chip.

In step S507, in a case where the total number $S_2$ of the core resources is greater than the total core resource number Z of the many-core chip, int8 is reduced to a lower grade, and a total number $S_3$ of the core resources required for quantifying all the networks to be quantified according to int4 is determined.

In step S508, whether the total number $S_3$ of the core resources is less than or equal to the total core resource number Z of the many-core chip is determined.

In step S509, in a case where the total number $S_3$ of the core resources is less than or equal to the total core resource number Z of the many-core chip, int4 is determined as the reference accuracy, the target accuracy corresponding to each network to be quantified is respectively determined, and the accuracy of each network to be quantified may be selected from fp32, int8 or int4, as long as it is ensured that a total number of the core resources required for quantifying all the networks to be quantified according to their respective target accuracy is less than or equal to the total core resource number Z of the many-core chip.

In step S510, in a case where the total number $S_3$ of the core resources is greater than the total core resource number Z of the many-core chip, int4 is reduced to a lower grade, and it is determined that the many-core chip cannot store all the networks at the same time.

In some embodiments, in a case where it is determined in step S502 that the total number $S_1$ of the core resources is greater than the total core resource number Z of the many-core chip and it is determined in step S505 that the total number $S_2$ of the core resources is less than or equal to the total core resource number Z of the many-core chip, int8 is determined as the reference accuracy, and a residual core resource number $Y_2$, which satisfies $Y_2=Z-S_2$, is determined. For calculating a core resource number difference of each network to be quantified between the number of the core resources required for quantifying each network to be quantified according to fp32 and the number of the core resources required for quantifying each network to be quantified according to int8, the core resource number difference of each network to be quantified is $W[i]=M[i][1]-M[i][2]$, and the target accuracy corresponding to each network to be quantified is determined according to the residual core resource number $Y_2$ and each core resource number difference of each network to be quantified obtained when being quantified grade by grade.

In some embodiments, in a case where it is determined in step S502 that the total number $S_1$ of the core resources is greater than the total core resource number Z of the many-core chip, it is determined in step S505 that the total number $S_2$ of the core resources is greater than the total core resource number Z of the many-core chip, and it is determined in step S508 that the total number $S_3$ of the core resources is less than or equal to the total core resource number Z of the many-core chip, int4 is determined as the reference accuracy, and a residual core resource number $Y_3$, which satisfies $Y_3=Z-S_3$, is determined. For calculating a core resource number difference of each network to be quantified between the number of the core resources required for quantifying each network to be quantified according to fp32, the number of the core resources required for quantifying each network to be quantified according to int8, and the number of the core resources required for quantifying each network to be quantified according to int4, the core resource number difference of each network to be quantified may be $W[i]=M[i][1]-M[i][3]$, and may also be $W[i]=M[i][2]-M[i][3]$, and the target accuracy corresponding to each network to be quantified is determined according to the residual core resource number $Y_3=Z-S_3$ and each core resource number difference of each network to be quantified obtained when being quantified grade by grade.

According to the present disclosure, when the target accuracy of each network to be quantified is determined, each network to be quantified may be quantified according to the reference accuracy, the residual core resource number obtained after the quantification is regarded as capacity of a new knapsack, the core resource number difference of each network to be quantified represents a value of an item in the new knapsack, a sum of values of all the networks to be quantified is made the largest through 0/1 knapsack dynamic programming algorithm, and at this time, the target accuracy corresponding to each network to be quantified when the sum of the values is the largest can be determined. According to the present disclosure, for the plurality of networks on the chip, the sum of the core resource number differences of all the networks being the largest is regarded as an optimal solution to the target accuracy of each network, so that the core resources of the chip can be most fully utilized, the core resources can be reasonably allocated, and accuracy loss caused by selecting single quantification accuracy for the plurality of networks can be reduced.

In an embodiment, not all the networks to be quantified correspond to same target accuracy.

Figure 6:
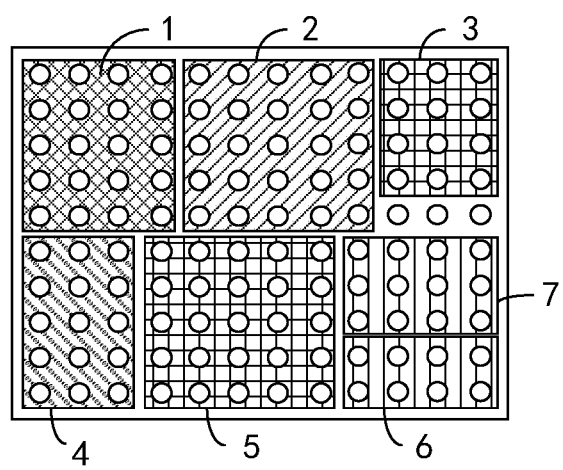
FIG. 6 is a schematic diagram of allocation of core resources of a many-core chip to a plurality of networks according to the present disclosure.

As shown in FIG. 6, it is obtained through the dynamic programming algorithm that the sum of the values of all the networks is the largest when a first network is quantified according to fp32, a second network, a fourth network and a fifth network are quantified according to int8, and a third network, a sixth network and a seventh network are quantified according to int4, that is, it is determined that a target accuracy of the first network is fp32, a target accuracy of the second network, the fourth network and the fifth network is int8, and a target accuracy of the third network, the sixth network and the seventh network is int4.

In some embodiments, all the networks to be quantified include a first type of networks to be quantified and a second type of networks to be quantified, a reference accuracy corresponding to the first type of networks to be quantified is a $j'^{th}$-grade accuracy determined for the $j'^{th}$ computation cycle, and a target accuracy corresponding to the second type of networks to be quantified is a $k^{th}$-grade accuracy determined for the $k^{th}$ computation cycle, where j' and k are both integers greater than or equal to 1.

Determining the target accuracy corresponding to each network to be quantified according to the reference accuracy and the total core resource number of the many-core chip includes: determining a total number $S_j$ of the core resources required for quantifying the first type of networks to be quantified according to the $j'^{th}$-grade accuracy and a total number $S_k$ of the core resources required for quantifying the second type of networks to be quantified according to the $k^{th}$-grade accuracy, where j' and k are both integers greater than or equal to 1; determining a residual core resource number $Y_{j'}$ according to the total number $S_{j'}$ of the core resources, the total number $S_k$ of the core resources and the total core resource number Z of the many-core chip, where $Y_{j'}=Z-S_{j'}-S_k$; determining at least one core resource number difference $W[i']=\{M[i'][1]-M[i'][j'], M[i'][2]-M[i'][j'] \ldots \}$ of the first type of networks to be quantified, with the at least one core resource number difference being a difference between the number of the core sources required for quantifying the first type of networks to be quantified according to each accuracy and the number of the core sources required for quantifying the first type of networks to be quantified according to the $j'^{th}$-grade accuracy, where W[i'] denotes a set of all the core resource number differences of the first type of networks to be quantified between the number of the core sources required for quantifying the first type of networks to be quantified according to each accuracy and the number of the core sources required for quantifying the first type of networks to be quantified according to the reference accuracy, i' is used to denote a number of the first type of networks to be quantified and is an integer greater than or equal to 1, and j' denotes a number of quantification accuracy; and determining the target accuracy corresponding to the first type of networks to be quantified according to the residual core resource number and each core resource number difference of the first type of networks to be quantified obtained when being quantified grade by grade.

In some embodiments, determining the target accuracy corresponding to the first type of networks to be quantified according to the residual core resource number $Y_{j'}$ and each core resource number difference of the first type of networks to be quantified obtained when being quantified grade by grade includes: determining, for each network of the first type of networks to be quantified, one core resource number difference among the at least one core resource number difference W[i'] to allow a sum of all core resource number differences of the first type of networks to be quantified, when being less than or equal to the residual core resource number $Y_{j'}$, to be the largest; and determining the target accuracy corresponding to the first type of networks to be quantified under a condition that the sum of all the core resource number differences of the first type of networks to be quantified is the largest.

According to the present disclosure, when each network to be quantified is subjected to accuracy quantification, the accuracy quantification can be carried out as required, for example, a certain network to be quantified or several networks to be quantified are quantified according to specified accuracy, and then target accuracies corresponding to the other networks to be quantified are determined.

Figure 7:
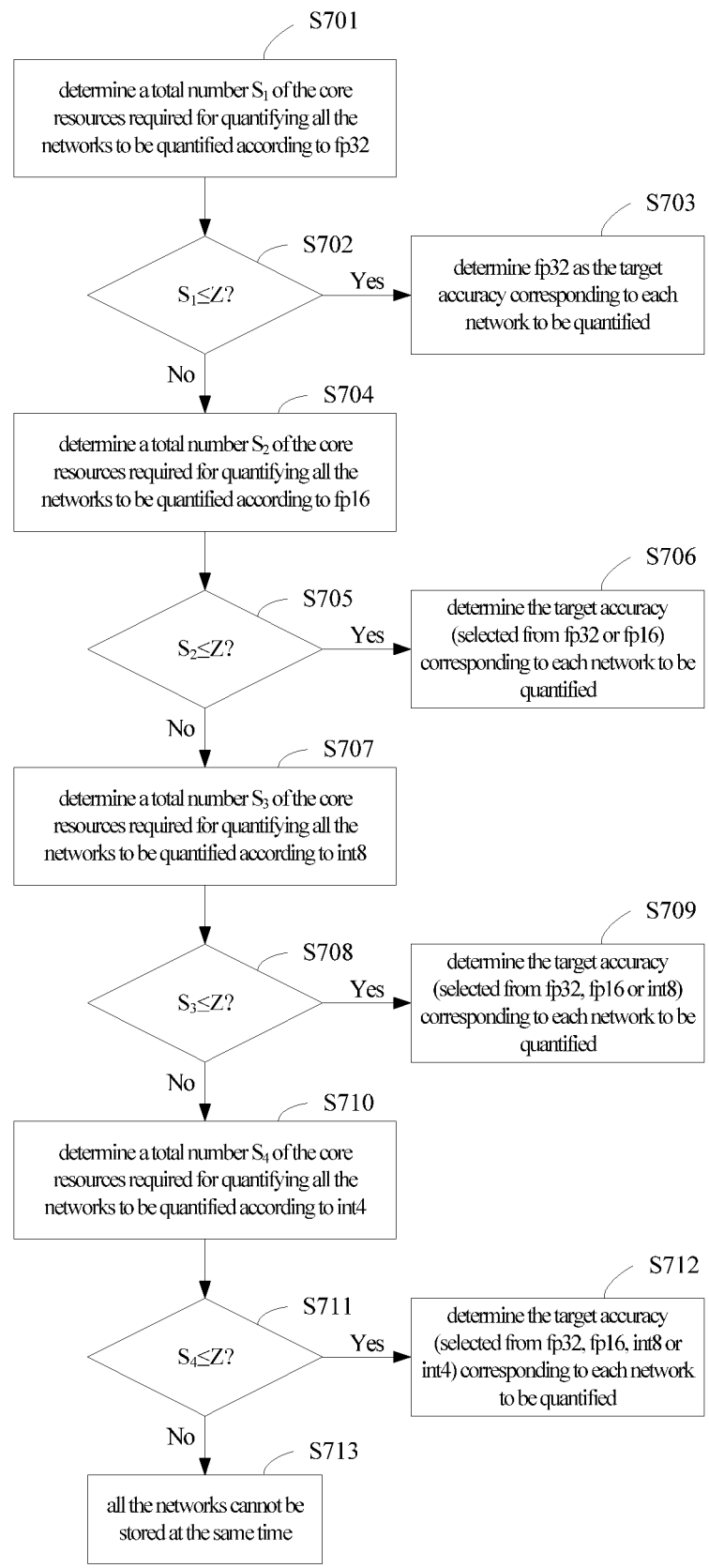
FIG. 7 is a schematic diagram of a process of quantifying a plurality of networks grade by grade according to the present disclosure.

As shown in FIG. 7, a plurality of neural networks are quantified grade to grade according to quantification accuracies of fp32, fp16, int8, and int4, that is, the first-grade accuracy is fp32, the second-grade accuracy is fp16, the third-grade accuracy is int8, and the fourth-grade accuracy is int4.

In step S701, a total number $S_1$ of the core resources required for quantifying all the networks to be quantified according to fp32 is determined.

In step S702, whether the total number $S_1$ of the core resources is less than or equal to the total core resource number Z of the many-core chip is determined.

In step S703, in a case where the total number $S_1$ of the core resources is less than or equal to the total core resource number Z of the many-core chip, fp32 is determined as the target accuracy corresponding to each network to be quantified, and each network to be quantified is quantified and allocated the core resources according to fp32.

In step S704, in a case where the total number $S_1$ of the core resources is greater than the total core resource number Z of the many-core chip, fp32 is reduced to a lower grade, and a total number $S_2$ of the core resources required for quantifying all the networks to be quantified according to fp16 is determined.

In step S705, whether the total number $S_2$ of the core resources is less than or equal to the total core resource number Z of the many-core chip is determined.

In step S706, in a case where the total number $S_2$ of the core resources is less than or equal to the total core resource number Z of the many-core chip, fp16 is determined as the reference accuracy.

In some embodiments, the target accuracy corresponding to each network to be quantified is determined according to the reference accuracy, and the accuracy of each network to be quantified may be selected from fp32 or fp16, as long as it is ensured that a total number of the core resources required for quantifying all the networks to be quantified according to their respective target accuracy is less than or equal to the total core resource number Z of the many-core chip.

In step S707, in a case where the total number $S_2$ of the core resources is greater than the total core resource number Z of the many-core chip, fp16 is reduced to a lower grade, and a total number $S_3$ of the core resources required for quantifying all the networks to be quantified according to int8 is determined.

In step S708, whether the total number $S_3$ of the core resources is less than or equal to the total core resource number Z of the many-core chip is determined.

In step S709, in a case where the total number $S_3$ of the core resources is less than or equal to the total core resource number Z of the many-core chip, int8 is determined as the reference accuracy.

In some embodiments, the target accuracy corresponding to each network to be quantified is determined according to the reference accuracy, and the accuracy of each network to be quantified may be selected from fp32, fp16 or int8, as long as it is ensured that a total number of the core resources required for quantifying all the networks to be quantified according to their respective target accuracy is less than or equal to the total core resource number Z of the many-core chip.

In step S710, in a case where the total number $S_3$ of the core resources is greater than the total core resource number Z of the many-core chip, int8 is reduced to a lower grade, and a total number $S_4$ of the core resources required for quantifying all the networks to be quantified according to int4 is determined.

In step S711, whether the total number $S_4$ of the core resources is less than or equal to the total core resource number Z of the many-core chip is determined.

In step S712, in a case where the total number $S_4$ of the core resources is less than or equal to the total core resource number Z of the many-core chip, int4 is determined as the reference accuracy, the target accuracy corresponding to each network to be quantified is respectively determined, and the accuracy of each network to be quantified may be selected from fp32, fp16, int8 or int4, as long as it is ensured that a total number of the core resources required for quantifying all the networks to be quantified according to their respective target accuracy is less than or equal to the total core resource number Z of the many-core chip.

In step S713, in a case where the total number $S_4$ of the core resources is greater than the total core resource number Z of the many-core chip, it is determined that all the networks cannot be stored at the same time.

In some embodiments, in a case where it is determined in step S702 that the total number $S_1$ of the core resources is greater than the total core resource number Z of the many-core chip, it is determined in step S705 that the total number $S_2$ of the core resources is greater than the total core resource number Z of the many-core chip, it is determined in step S708 that the total number $S_3$ of the core resources is greater than the total core resource number Z of the many-core chip, and it is determined in step S711 that the total number $S_4$ of the core resources is less than or equal to the total core resource number Z of the many-core chip, int4 is determined as the reference accuracy of the first type of networks to be quantified, a total number of the core resources required for quantifying the first type of networks to be quantified according to int4 is $S_4$, and a total number of the core resources required for quantifying the second type of networks to be quantified according to a specified accuracy fp32 is $S_k$. At this time, a residual core resource number $Y_4$, which satisfies $Y_4=Z-S_4-S_k$, is determined. For calculating a core resource number difference of the first type of networks to be quantified between the number of the core resources required for quantifying the first type of networks to be quantified according to fp32, the number of the core resources required for quantifying the first type of networks to be quantified according to fp16, the number of the core resources required for quantifying the first type of networks to be quantified according to int8 and the number of the core resources required for quantifying the first type of networks to be quantified according to int4, the core resource number difference of each network of the first type of networks to be quantified may be W[i']=M[i'][1]−M[i'][4] or W[i']=M[i'][2]−M[i'][4], and may also be W[i']=M[i'][3]−M[i'][4], and the target accuracy corresponding to each network of the first type of networks to be quantified is determined according to the residual core resource number $Y_4=Z-S_4-S_k$ and each core resource number difference of the first type of networks to be quantified obtained when being quantified grade by grade.

According to the present disclosure, when the target accuracy of each network to be quantified is determined, the first type of networks to be quantified may be quantified according to the reference accuracy, the second type of networks to be quantified may be quantified according to the specified accuracy, the residual core resource number obtained after the quantification of the two types of networks to be quantified is regarded as capacity of a new knapsack, the core resource number difference of each network of the first type of networks to be quantified represents a value of an item in the new knapsack, a sum of values of the first type of networks to be quantified is made the largest through 0/1 knapsack dynamic programming algorithm, and at this time, the target accuracy corresponding to the first type of networks to be quantified when the sum of the values is the largest can be determined.

The method provided by the present disclosure solves the problem of allocation of resources in a multi-network model chip of neural networks by means of quantification, solves the problem of optimal selection of quantification accuracy by a multi-grade dynamic programming algorithm, and optimizes allocation and unitization of a memory in a chip. Moreover, when the memory is allocated to a plurality of network modules in the chip, full unitization of limited memory resources in the chip is realized, and meanwhile the accuracy loss caused by excessive quantification is reduced.

In a second aspect, the present disclosure provides a method for allocating resources in a chip, which is applicable to a many-core chip.

The method for allocating resources in a chip includes: allocating core resources in a many-core chip to a neural network according to a target accuracy corresponding to the neural network, and the target accuracy is determined with the network accuracy quantification method provided by the present disclosure. The network accuracy quantification method is as described above, and will not be repeated here.

The method for allocating resources in a chip provided by the present disclosure solves the problem of allocation of resources in a multi-network model chip of neural networks by means of quantification, solves the problem of optimal selection of quantification accuracy by a multi-grade dynamic programming algorithm, and optimizes allocation and unitization of a memory in a chip. Moreover, when the memory is allocated to a plurality of network modules in the chip, full unitization of limited memory resources in the chip is realized, and meanwhile the accuracy loss caused by excessive quantification is reduced.

In a third aspect, the present disclosure further provides a network accuracy quantification system, which is applicable to a many-core chip.

Figure 8:
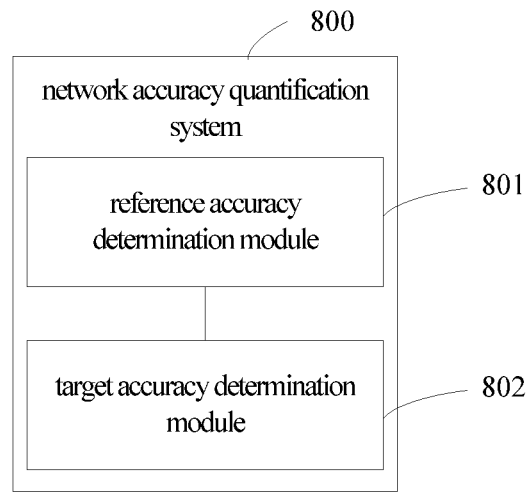
FIG. 8 is a block diagram of a network accuracy quantification system according to the present disclosure.

FIG. 8 is a block diagram of a network accuracy quantification system according to the present disclosure. As shown in FIG. 8, the network accuracy quantification system 800 includes a reference accuracy determination module 801 configured to determine a reference accuracy according to a total core resource number of a many-core chip and the number of the core resources required by each network to be quantified.

The number of the core resources required by each network to be quantified is the number of the core resources which is determined after each network to be quantified is quantified.

The number of the core resources required by the network to be quantified refers to the number of the core resources required for quantifying the network to be quantified to determine the network to be quantified. When each network to be quantified is quantified, the quantification may be performed according to a certain accuracy, which may be set in advance, for example, sorting is carried out according to grades of quantification accuracy, the higher the accuracy is, the greater the number of the core resources required by the network to be quantified is, and the lower the accuracy is, the smaller the number of the core resources required by the network to be quantified is. When the quantification accuracy is set, the quantification accuracy may be set in an order from a high-grade quantification accuracy to a low-grade quantification accuracy.

The network accuracy quantification system 800 further includes a target accuracy determination module 802 configured to determine a target accuracy corresponding to each network to be quantified according to the reference accuracy and the total core resource number of the many-core chip.

The networks to be quantified may be various neural network models which need to be quantified. The total core resource number of the many-core chip may refer to the number of cores of the many-core chip or core storage resources of the many-core chip. The reference accuracy and the target accuracy may be determined from various kinds of quantification accuracy. For example, the quantification accuracy may include one or more of fp32 (a 32-bit data type), fp16 (a 16-bit data type), int8 (an 8-bit data type), and int4 (a 4-bit data type).

Figure 9:
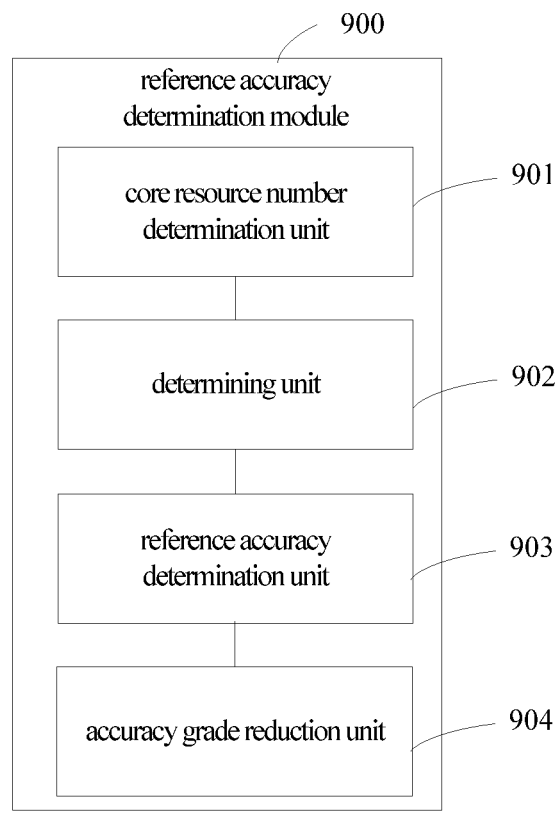
FIG. 9 is a block diagram of a reference accuracy determination module according to the present disclosure.

In some embodiments, as shown in FIG. 9, a reference accuracy determination module 900 includes: a core resource number determination unit 901 configured to determine a total number of the core resources required for quantifying all the networks to be quantified according to an initial accuracy of a current cycle; and a determining unit 902 configured to determine whether the total number of the core resources is less than or equal to the total core resource number of the many-core chip to obtain a determination result.

In some embodiments, the total number of the core resources required for quantifying all the networks to be quantified according to the initial accuracy of the current cycle is compared with the total core resource number of the many-core chip, that is, the total number of the core resources and the total core resource number are compared in terms of magnitude, thus obtaining the determination result.

The reference accuracy determination module 900 further includes a reference accuracy determination unit 903 configured to determine the initial accuracy of the current cycle as the reference accuracy in a case where the determination result is yes.

When the determination result is yes, that is, when the total number of the core resources is less than or equal to the total core resource number of the many-core chip, it is indicated that the many-core chip may meet a requirement of the total number of the core resources required for quantifying neural networks according to the initial accuracy of the current cycle, so that the initial accuracy of the current cycle is determined as the reference accuracy. When the total number of the core resources is greater than the total core resource number of the many-core chip, it is indicated that the many-core chip may not meet the requirement of the total number of the core resources required for quantifying the neural networks according to the initial accuracy of the current cycle.

The reference accuracy determination module 900 further includes an accuracy grade reduction unit 904 configured to reduce, in a case where the determination result is no, the initial accuracy of the current cycle to a lower grade to determine an initial accuracy of a next computation cycle.

When the determination result is no, that is, when the total number of the core resources required for quantifying all the networks to be quantified according to the initial accuracy of the current cycle is greater than the total core resource number of the many-core chip, it is indicated that the total core resource number of the many-core chip may not meet the requirement of the total number of the core resources required for quantifying all the networks to be quantified according to the initial accuracy of the current cycle. Therefore, the initial accuracy of the current cycle is reduced to a lower grade, and a quantification accuracy such obtained is determined as the initial accuracy of the next computation cycle.

It should be noted that a preset cut-off condition may be set by a user. In the embodiments, the preset cut-off condition is that the total number of the core resources required for quantifying all the networks to be quantified according to the initial accuracy of the current cycle is less than or equal to the total core resource number of the many-core chip.

In some embodiments, the core resource number determination unit 901 includes a calculation subunit configured to calculate the number $M[i][L]$ of the core resources required for quantifying an $i^{th}$ network to be quantified according to an initial accuracy of the $L^{th}$ computation cycle.

Where i denotes a number of a network to be quantified, L denotes a number of a computation cycle, i is a natural number taken from 1 to N, and N is the number of all the networks to be quantified.

The calculation subunit is further configured to determine a total number $S_L$ of the core resources required for quantifying all the networks to be quantified according to the initial accuracy of the $L^{th}$ computation cycle, where $$S_L = \sum_{i=1}^{N} M[i][L].$$

In some embodiments, the quantification accuracy includes one or more of fp32, fp16, int8, and int4. The quantification accuracy is sorted in order of grade, and the larger the number, the higher the quantification accuracy. For example, the first-grade accuracy is fp32, the second-grade accuracy is fp16, the third-grade accuracy is int8, and the fourth-grade accuracy is int4.

When a total number $S_1$ of the core resources required for quantifying all the networks to be quantified according to fp32 is greater than the total core resource number Z of the many-core chip, the quantification accuracy is reduced grade by grade. For example, a total number $S_2$ of the core resources required for quantifying all the networks to be quantified according to fp16 is determined. If the total number $S_2$ of the core resources required for quantifying all the networks to be quantified according to fp16 is less than or equal to the total core resource number Z of the many-core chip, fp16 is determined as the reference accuracy.

When the total number $S_2$ of the core resources required for quantifying all the networks to be quantified according to fp16 is greater than the total core resource number Z of the many-core chip, the quantification accuracy is continuously reduced grade by grade, a total number $S_3$ of the core resources required for quantifying all the networks to be quantified according to int8 is determined, and int8 is determined as the reference accuracy if the total number $S_3$ of the core resources is less than or equal to the total core resource number Z of the many-core chip. If the total number $S_3$ of the core resources is greater than the total core resource number Z of the many-core chip, the quantification accuracy is reduced grade by grade, and so on. For example, when it is determined that a total number $S_4$ of the core resources required for quantifying all the networks to be quantified according to int4 is less than or equal to the total core resource number Z of the many-core chip, int4 is determined as the reference accuracy.

Figure 10:
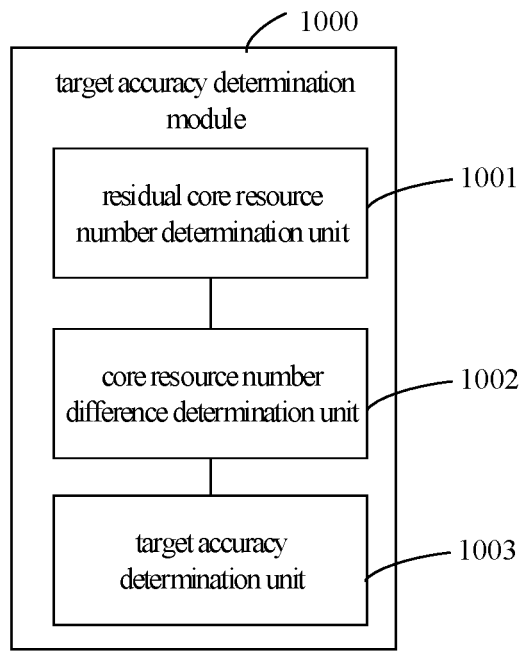
FIG. 10 is a block diagram of a target accuracy determination module according to the present disclosure.

In some embodiments, as shown in FIG. 10, a target accuracy determination module 1000 includes a residual core resource number determination unit 1001 configured to determine a residual core resource number $Y_j$ according to a total number $S_j$ of the core resources required for quantifying all the networks to be quantified according to the reference accuracy and the total core resource number Z of the many-core chip.

In some embodiments, the residual core resource number $Y_j$ is a difference obtained by subtracting the total number $S_j$ of the core resources required for quantifying all the networks to be quantified according to the reference accuracy from the total core resource number Z of the many-core chip, that is, the residual core resource number $Y_j = Z - S_j$.

The target accuracy determination module 1000 further includes a core resource number difference determination unit 1002 configured to determine at least one core resource number difference W[i]={M[i][1]−M[i][j], M[i][2]−M[i][j] . . . } of each network to be quantified between the number of the core sources required for quantifying each network to be quantified according to each accuracy and the number of the core sources required for quantifying each network to be quantified according to the reference accuracy.

Where W[i] is a core resource number difference, i is used to denote a number of the network to be quantified and is a natural number taken from 1 to N, and N denotes the number of all the networks to be quantified.

The target accuracy determination module 1000 further includes a target accuracy determination unit 1003 configured to determine the target accuracy corresponding to each network to be quantified according to the residual core resource number $Y_j$ and each core resource number difference of each network to be quantified obtained when being quantified grade by grade.

In some embodiments, determining the target accuracy corresponding to each network to be quantified according to the residual core resource number $Y_j$ and each core resource number difference of each network to be quantified obtained when being quantified grade by grade includes: determining, for each network to be quantified, one core resource number difference among the at least one core resource number difference W[i] to allow a sum of all core resource number differences of all the networks to be quantified, when being less than or equal to the residual core resource number $Y_j$, to be the largest; and determining the target accuracy corresponding to each network to be quantified under a condition that the sum of all the core resource number differences of all the networks to be quantified is the largest.

In some embodiments, the target accuracy determination unit 1003 includes: a core resource number difference determination subunit configured to determine, for each network to be quantified, one core resource number difference among the at least one core resource number difference W[i] to allow a sum of all the core resource number differences of all the networks to be quantified, when being less than or equal to the residual core resource number $Y_j$, to be the largest; and a target accuracy determining subunit configured to determine the target accuracy corresponding to each network to be quantified under a condition that the sum of all the core resource number differences of all the networks to be quantified is the largest.

In some embodiments, all the networks to be quantified include a first type of networks to be quantified and a second type of networks to be quantified, and target accuracy corresponding to the second type of networks to be quantified is a $k^{th}$-grade accuracy.

A total number $S_{j'}$ of the core resources required for quantifying the first type of networks to be quantified according to the $j'^{th}$-grade accuracy, which is the reference accuracy and a total number $S_k$ of the core resources required for quantifying the second type of networks to be quantified according to the $k^{th}$-grade accuracy are determined, where j' and k are both integers greater than or equal to 1; and a residual core resource number $Y_{j'}$ is determined according to the total number $S_{j'}$ of the core resources, the total number $S_k$ of the core resources and the total core resource number Z of the many-core chip, where $Y_{j'}=Z-S_{j'}-S_k$.

At least one core resource number difference W[i']={M[i'][1]−M[i'][j'], M[i'][2]−M[i'][j'] . . . } of the first type of networks to be quantified is determined, with the at least one core resource number difference being a difference between the number of the core sources required for quantifying the first type of networks to be quantified according to each accuracy and the number of the core sources required for quantifying the first type of networks to be quantified according to the $j'^{th}$-grade accuracy, where W[i'] denotes a set of all the core resource number differences of the first type of networks to be quantified between the number of the core sources required for quantifying the first type of networks to be quantified according to each accuracy and the number of the core sources required for quantifying the first type of networks to be quantified according to the reference accuracy, i' is used to denote a number of the first type of networks to be quantified and is an integer greater than or equal to 1, and j' denotes a number of quantification accuracy; and the target accuracy corresponding to the first type of networks to be quantified is determined according to the residual core resource number $Y_{j'}$ and each core resource number difference of the first type of networks to be quantified obtained when being quantified grade by grade.

In some embodiments, determining the target accuracy corresponding to the first type of networks to be quantified according to the residual core resource number $Y_{j'}$ and each core resource number difference of the first type of networks to be quantified obtained when being quantified grade by grade includes: determining, for each network of the first type of networks to be quantified, one core resource number difference among the at least one core resource number difference W[i'] to allow a sum of all core resource number differences of the first type of networks to be quantified, when being less than or equal to the residual core resource number $Y_{j'}$, to be the largest; and determining the target accuracy corresponding to the first type of networks to be quantified under a condition that the sum of all the core resource number differences of the first type of networks to be quantified is the largest.

In an embodiment, not all the networks to be quantified correspond to same target accuracy.

The quantification accuracy includes one or more of the first-grade accuracy, the second-grade accuracy, the third-grade accuracy and the fourth-grade accuracy, with the first-grade accuracy being fp32, the second-grade accuracy being fp16, the third-grade accuracy being int8 and the fourth-grade accuracy being int4.

In the first computation cycle, the initial accuracy may be set to be the first-grade accuracy. In practical applications, the initial accuracy may be set to an accuracy in another grade as required or according to quantification information that is known in advance.

According to the present disclosure, when each network to be quantified is subjected to accuracy quantification, the accuracy quantification can be carried out as required, for example, a certain network to be quantified or several networks to be quantified are quantified according to a specified accuracy, and then target accuracies corresponding to the other networks to be quantified are determined.

The network accuracy quantification method provided by the present disclosure is described below with reference to FIG. 7 to FIG. 10. A plurality of neural networks are quantified grade to grade according to quantification accuracies of fp32, fp16, int8, and int4, that is, the first-grade accuracy is fp32, the second-grade accuracy is fp16, the third-grade accuracy is int8, and the fourth-grade accuracy is int4, and the quantification is carried out grade by grade.

In step S701, a total number $S_1$ of the core resources required for quantifying all the networks to be quantified according to fp32 is determined by the core resource number determination unit 901.

In step S702, whether the total number $S_1$ of the core resources is less than or equal to the total core resource number Z of the many-core chip is determined by the determining unit 902.

In step S703, in a case where the total number $S_1$ of the core resources is less than or equal to the total core resource number Z of the many-core chip, fp32 is determined by the reference accuracy determination unit 903 as the target accuracy corresponding to each network to be quantified, and each network to be quantified is quantified and allocated the core resources according to fp32.

In step S704, in a case where the total number $S_1$ of the core resources is greater than the total core resource number Z of the many-core chip, the reference accuracy determination unit 903 reduces fp32 to a lower grade, and a total number $S_2$ of the core resources required for quantifying all the networks to be quantified according to fp16 is determined by the core resource number determination unit 901.

In step S705, whether the total number $S_2$ of the core resources is less than or equal to the total core resource number Z of the many-core chip is determined by the determining unit 902.

In step S706, in a case where the total number $S_2$ of the core resources is less than or equal to the total core resource number Z of the many-core chip, fp16 is determined as the reference accuracy by the reference accuracy determination unit 903.

In some embodiments, the target accuracy corresponding to each network to be quantified is determined according to the reference accuracy, and the accuracy of each network to be quantified may be selected from fp32 or fp16, as long as it is ensured that a total number of the core resources required for quantifying all the networks to be quantified according to their respective target accuracy is less than or equal to the total core resource number Z of the many-core chip.

In step S707, in a case where the total number $S_2$ of the core resources is greater than the total core resource number Z of the many-core chip, the reference accuracy determination unit 903 reduces fp16 to a lower grade, and a total number $S_3$ of the core resources required for quantifying all the networks to be quantified according to int8 is determined by the core resource number determination unit 901.

In step S708, whether the total number $S_3$ of the core resources is less than or equal to the total core resource number Z of the many-core chip is determined by the determining unit 902.

In step S709, in a case where the total number $S_3$ of the core resources is less than or equal to the total core resource number Z of the many-core chip, int8 is determined as the reference accuracy by the reference accuracy determination unit 903.

In some embodiments, the target accuracy corresponding to each network to be quantified is determined according to the reference accuracy, and the accuracy of each network to be quantified may be selected from fp32, fp16 or int8, as long as it is ensured that a total number of the core resources required for quantifying all the networks to be quantified according to their respective target accuracy is less than or equal to the total core resource number Z of the many-core chip.

In step S710, in a case where the total number $S_3$ of the core resources is greater than the total core resource number Z of the many-core chip, the reference accuracy determination unit 903 reduces int8 to a lower grade, and a total number $S_4$ of the core resources required for quantifying all the networks to be quantified according to int4 is determined by the core resource number determination unit 901.

In step S711, whether the total number $S_4$ of the core resources is less than or equal to the total core resource number Z of the many-core chip is determined by the determining unit 902.

In step S712, in a case where the total number $S_4$ of the core resources is less than or equal to the total core resource number Z of the many-core chip, int4 is determined as the reference accuracy by the reference accuracy determination unit 903, the target accuracy corresponding to each network to be quantified is respectively determined, and the accuracy of each network to be quantified may be selected from fp32, fp16, int8 or int4, as long as it is ensured that a total number of the core resources required for quantifying all the networks to be quantified according to their respective target accuracy is less than or equal to the total core resource number Z of the many-core chip.

In step S713, in a case where the total number $S_4$ of the core resources is greater than the total core resource number Z of the many-core chip, it is determined by the reference accuracy determination unit 903 that all the networks cannot be stored at the same time.

In some embodiments, in a case where it is determined in step S702 that the total number $S_1$ of the core resources is greater than the total core resource number Z of the many-core chip, it is determined in step S705 that the total number $S_2$ of the core resources is greater than the total core resource number Z of the many-core chip, it is determined in step S708 that the total number $S_3$ of the core resources is greater than the total core resource number Z of the many-core chip, and it is determined in step S711 that the total number $S_4$ of the core resources is less than or equal to the total core resource number Z of the many-core chip, int4 is determined as the reference accuracy of the first type of networks to be quantified, a total number of the core resources required for quantifying the first type of networks to be quantified according to int4 is $S_4$, and a total number of the core resources required for quantifying the second type of networks to be quantified according to a specified accuracy fp32 is $S_k$. At this time, a residual core resource number $Y_4$, which satisfies $Y_4 = Z - S_4 - S_k$, is determined. For calculating a core resource number difference of the first type of networks to be quantified between the number of the core resources required for quantifying the first type of networks to be quantified according to fp32, the number of the core resources required for quantifying the first type of networks to be quantified according to fp16, the number of the core resources required for quantifying the first type of networks to be quantified according to int8 and the number of the core resources required for quantifying the first type of networks to be quantified according to int4, the core resource number difference of each network of the first type of networks to be quantified may be $W[i']=M[i'][1]-M[i'][4]$ or $W[i']=M[i'][2]-M[i'][4]$, and may also be $W[i']=M[i'][3]-M[i'][4]$, and the target accuracy corresponding to each network of the first type of networks to be quantified is determined according to the residual core resource number $Y_4 = Z - S_4 - S_k$ and each core resource number difference of the first type of networks to be quantified obtained when being quantified grade by grade.

According to the present disclosure, when the target accuracy of each network to be quantified is determined, the first type of networks to be quantified may be quantified according to the reference accuracy, the second type of networks to be quantified may be quantified according to the specified accuracy, the residual core resource number obtained after the quantification of the two types of networks to be quantified is regarded as capacity of a new knapsack, the core resource number difference of each network of the first type of networks to be quantified represents a value of an item in the new knapsack, a sum of values of the first type of networks to be quantified is made the largest through 0/1 knapsack dynamic programming algorithm, and at this time, the target accuracy corresponding to the first type of networks to be quantified when the sum of the values is the largest can be determined.

Figure 11:
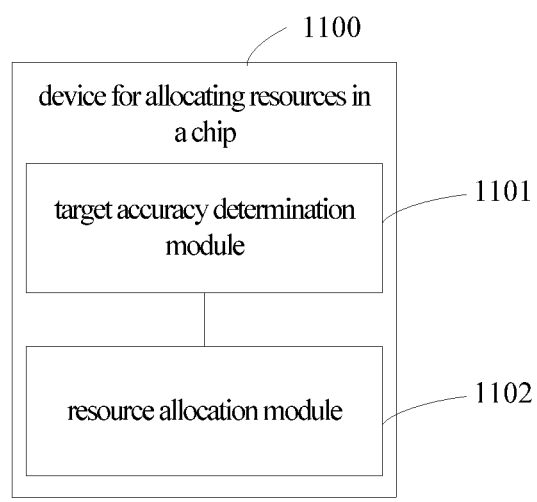
FIG. 11 is a block diagram of a device for allocating resources in a chip according to the present disclosure.

In a fourth aspect, as shown in FIG. 11, the present disclosure further provides a device for allocating resources in a chip 1100, including: a target accuracy determination module 1101 configured to determine a target accuracy according to the network accuracy quantification method provided by the present disclosure; and a resource allocation module 1102 configured to allocate core resources in a many-core chip to a neural network according to the target accuracy corresponding to the neural network.

The device for allocating resources in a chip provided by the present disclosure solves the problem of allocation of resources in a multi-network model chip of neural networks by means of quantification, solves the problem of optimal selection of quantification accuracy by a multi-grade dynamic programming algorithm, and optimizes allocation and unitization of a memory in a chip. Moreover, when the memory is allocated to a plurality of network modules in the chip, full unitization of limited memory resources in the chip is realized, and meanwhile the accuracy loss caused by excessive quantification is reduced.

Figure 12:
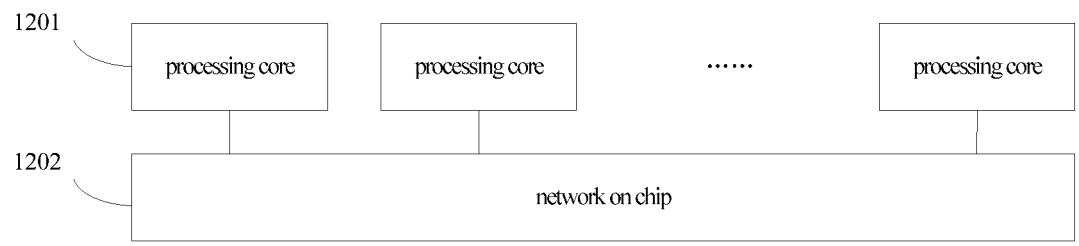
FIG. 12 is a block diagram of an electronic device according to the present disclosure.

In a fifth aspect, FIG. 12 is a block diagram of an electronic device according to the present disclosure.

With reference to FIG. 12, the present disclosure further provides an electronic device, including a plurality of processing cores 1201 and a network on chip 1202. The plurality of processing cores 1201 are all connected to the network on chip 1202, and the network on chip 1202 is configured for interchange of data among the plurality of processing cores 1201 and interchange with external data.

One or more processing cores 1201 have stored therein one or more instructions which, when executed by the one or more processing cores 1201, cause the one or more processing cores 1201 to perform the above network accuracy quantification method and/or the above method for allocating resources in a chip.

In a sixth aspect, the present disclosure further provides a computer-readable medium having a computer program stored thereon. When the computer program is executed by a processing core, the above network accuracy quantification method and/or the above method for allocating resources in a chip are implemented.

It should be understood by those of ordinary skill in the art that the functional modules/units in all or some of the steps, the systems and the devices in the methods disclosed above may be implemented as software, firmware, hardware, or suitable combinations thereof. If implemented as hardware, the division between the functional modules/units stated above is not necessarily corresponding to the division of physical components; for example, one physical component may have a plurality of functions, or one function or step may be performed through cooperation of several physical components. Some or all of the physical components may be implemented as software executed by a processor, such as a central processing unit, a digital signal processor or a microprocessor, or may be implemented as hardware, or may be implemented as an integrated circuit, such as an application specific integrated circuit. Such software may be distributed on a computer-readable medium, which may include a computer storage medium (or a non-transitory medium) and a communication medium (or a transitory medium). As well known by those of ordinary skill in the art, the term "computer storage medium" includes volatile/nonvolatile and removable/non-removable media used in any method or technology for storing information (such as computer-readable instructions, data structures, program modules and other data). The computer storage medium includes, but is not limited to, a Random Access Memory (RAM), a Read-Only Memory (ROM), an Electrically Erasable Programmable Read-Only Memory (EEPROM), a flash memory or other memory techniques, a Compact Disc Read Only Memory (CD-ROM), a Digital Versatile Disc (DVD) or other optical discs, a magnetic cassette, a magnetic tape, a magnetic disk or other magnetic storage devices, or any other medium which can be configured to store desired information and can be accessed by a computer. In addition, it is well known by those of ordinary skill in the art that the communication media generally include computer-readable instructions, data structures, program modules, or other data in modulated data signals such as carrier wave or other transmission mechanism, and may include any information delivery medium.

The present disclosure discloses the exemplary embodiments using specific terms, but the terms are merely used and should be merely interpreted as having general illustrative meanings, rather than for the purpose of limitation. In some embodiments, unless expressly stated otherwise, it is apparent to those of ordinary skill in the art that features, characteristics and/or elements described in connection with a particular embodiment can be used alone or in combination with features, characteristics and/or elements described in connection with other embodiments. Therefore, it should be understood by those of ordinary skill in the art that various changes in the forms and the details can be made without departing from the scope of the present disclosure stated in the appended claims.

What is claimed is:

1. A network accuracy quantification method applicable to a many-core chip, comprising:
   determining a reference accuracy according to a total core resource number of the many-core chip and the number of core resources required by each network to be quantified, with the number of the core resources required by each network to be quantified being the number of the core resources which is determined after each network to be quantified is quantified; and
   determining a target accuracy corresponding to each network to be quantified according to the reference accuracy and the total core resource number of the many-core chip,
   wherein determining the reference accuracy according to the total core resource number of the many-core chip and the number of the core resources required by each network to be quantified comprises at least one computation cycle until a preset cut-off condition is met, and following steps are performed in each computation cycle:
   determining a total number of the core resources required for quantifying all the networks to be quantified according to an initial accuracy of a current cycle;
   determining whether the total number of the core resources is less than or equal to the total core resource number of the many-core chip to obtain a determination result;

in a case where the determination result is yes, determining the initial accuracy of the current cycle as the reference accuracy; and in a case where the determination result is no, reducing the initial accuracy of the current cycle a lower grade to determine an initial accuracy of a next computation cycle.

2. The network accuracy quantification method of claim 1, wherein in the $L^{th}$ computation cycle, determining the total number of the core resources required for quantifying all the networks to be quantified according to the initial accuracy comprises:

calculating the number M[i][L] of the core resources required for quantifying each network to be quantified according to the initial accuracy of the $L^{th}$ computation cycle, where i denotes a number of a network to be quantified, L denotes a number of the computation cycle, i is a natural number taken from 1 to N, and N is the number of all the networks to be quantified; and determining the total number $S_L$ of the core resources required for quantifying all the networks to be quantified according to the initial accuracy of the $L^{th}$ computation cycle;

wherein $S_L = \sum_{i=1}^{N} M[i][L]$.

3. The network accuracy quantification method of claim 1, wherein the reference accuracy is a $j^{th}$-grade accuracy determined for the $j^{th}$ computation cycle, with j being a positive integer, and determining the target accuracy corresponding to each network to be quantified according to the reference accuracy and the total core resource number of the many-core chip comprises:

determining a residual core resource number $Y_j$ according to a total number $S_j$ of the core resources required for quantifying all the networks to be quantified according to the reference accuracy and the total core resource number Z of the many-core chip;

determining at least one core resource number difference W[i]={M[i][1]−M[i][j],M[i][2]−M[i][j] . . . } of each network to be quantified, with the at least one core resource number difference being a difference between the number of the core sources required for quantifying each network to be quantified according to each accuracy and the number of core sources required for quantifying each network to be quantified according to the reference accuracy, wherein W[i] is a core resource number difference, i is used to denote a number of the network to be quantified and is a natural number taken from 1 to N, and N is a number of all the networks to be quantified; and determining the target accuracy corresponding to each network to be quantified according to the residual core resource number $Y_j$ and each core resource number difference of each network to be quantified obtained when being quantified grade by grade.

4. The network accuracy quantification method of claim 3, wherein determining the target accuracy corresponding to each network to be quantified according to the residual core resource number $Y_j$ and each core resource number difference of each network to be quantified obtained when being quantified grade by grade comprises:

determining, for each network to be quantified, one core resource number difference among the at least one core resource number difference to allow a sum of all core resource number differences of all the networks to be quantified, when being less than or equal to the residual core resource number $Y_j$, to be the largest; and determining the target accuracy corresponding to each network to be quantified under a condition that the sum of all the core resource number differences of all the networks to be quantified is the largest.

5. The network accuracy quantification method of claim 1, wherein a quantification accuracy comprises one or more of a first-grade accuracy, a second-grade accuracy, a third-grade accuracy and a fourth-grade accuracy, with the first-grade accuracy being fp32, the second-grade accuracy being fp16, the third-grade accuracy being int8 and the fourth-grade accuracy being int4.

6. A method for allocating resources in a chip, comprising:

allocating core resources in a many-core chip to a neural network according to a target accuracy corresponding to the neural network, wherein the target accuracy is determined with the network accuracy quantification method of claim 1.

7. An electronic device, comprising:

a plurality of processing cores; and a network on chip configured for interchange of data among the plurality of processing cores and interchange with external data;

wherein one or more of the plurality of processing cores have stored therein one or more instructions which, when executed by the one or more of the plurality of processing cores, cause the one or more of the plurality of processing cores to perform the method of claim 1.

8. A non-transient computer-readable storage medium having stored thereon a computer program which implements, when executed by a processor, the method of claim 1 is implemented.

9. A network accuracy quantification method applicable to a many-core chip, comprising:

determining a reference accuracy according to a total core resource number of the many-core chip and the number of core resources required by each network to be quantified, with the number of the core resources required by each network to be quantified being the number of the core resources which is determined after each network to be quantified is quantified; and determining a target accuracy corresponding to each network to be quantified according to the reference accuracy and the total core resource number of the many-core chip, wherein all the networks to be quantified comprise a first type of networks to be quantified and a second type of networks to be quantified, the target accuracy corresponding to the second type of networks to be quantified is a $k^{th}$-grade accuracy determined for the $k^{th}$ computation cycle, and the reference accuracy corresponding to the first type of networks to be quantified is a $j'^{th}$-grade accuracy determined for the $j'^{th}$ computation cycle, where j' and k are both integers greater than or equal to 1, and determining the target accuracy corresponding to each network to be quantified according to the reference accuracy and the total core resource number of the many-core chip comprises:

determining a total number $S_{j'}$ of the core resources required for quantifying the first type of networks to be quantified according to the $j'^{th}$-grade accuracy and a total number $S_k$ of the core resources required for quantifying the second type of networks to be quantified according to the $k^{th}$-grade accuracy;

determining a residual core resource number $Y_{j'}$ according to the total number $S_{j'}$ of the core resources, the total number $S_k$ of the core resources and the total core resource number Z of the many-core chip, where $Y_{j'}=Z-S_{j'}-S_k$;

determining at least one core resource number difference $W[i']=\{M[i'][1]-M[i'][j'],M[i'][2]-M[i'][j']\ldots\}$ of the first type of networks to be quantified, with the at least one core resource number difference being a difference between the number of the core sources required for quantifying the first type of networks to be quantified according to each accuracy and the number of the core sources required for quantifying the first type of networks to be quantified according to the $j^{th}$-grade accuracy;

determining the target accuracy corresponding to the first type of networks to be quantified according to the residual core resource number $Y_{j'}$ and each core resource number difference of the first type of networks to be quantified obtained when being quantified grade by grade, wherein W [i'] denotes a set of all the core resource number differences of the first type of networks to be quantified between the number of the core sources required for quantifying the first type of networks to be quantified according to each accuracy and the number of the core sources required for quantifying the first type of networks to be quantified according to the reference accuracy;

wherein i' is used to denote a number of the first type of networks to be quantified and is an integer greater than or equal to 1.

10. The network accuracy quantification method of claim 9, wherein determining the target accuracy corresponding to the first type of networks to be quantified according to the residual core resource number $Y_{j'}$ and each core resource number difference of the first type of networks to be quantified obtained when being quantified grade by grade comprises:

determining, for each network of the first type of networks to be quantified, one core resource number difference among the at least one core resource number difference to allow a sum of all core resource number differences of the first type of networks to be quantified, when being less than or equal to the residual core resource number $Y_{j'}$, to be the largest; and determining the target accuracy corresponding to the first type of networks to be quantified under a condition that the sum of all the core resource number differences of the first type of networks to be quantified is the largest.

11. A method for allocating resources in a chip, comprising:

allocating core resources in a many-core chip to a neural network according to a target accuracy corresponding to the neural network, wherein the target accuracy is determined with the network accuracy quantification method of claim 9.

12. An electronic device, comprising:

a plurality of processing cores; and a network on chip configured for interchange of data among the plurality of processing cores and interchange with external data;

wherein one or more of the plurality of processing cores have stored therein one or more instructions which, when executed by the one or more of the plurality of processing cores, cause the one or more of the plurality of processing cores to perform the method of claim 9.

13. A non-transient computer-readable storage medium having stored thereon a computer program which implements, when executed by a processor, the method of claim 9 is implemented.

* * * * *